(12) United States Patent
DeFazio et al.

(10) Patent No.: US 6,418,430 B1
(45) Date of Patent: Jul. 9, 2002

(54) SYSTEM FOR EFFICIENT CONTENT-BASED RETRIEVAL OF IMAGES

(75) Inventors: Samuel DeFazio, Hollis; Rajiv Chopra, Nashua; Jagannathan Srinivsan, Nashua; Melliyal Annamalai, Nashua, all of NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/329,530

(22) Filed: Jun. 10, 1999

(51) Int. Cl.[7] .............................................. G06F 17/30
(52) U.S. Cl. .............................. 707/3; 707/4; 707/102; 707/104.1; 382/115; 382/209; 382/220; 382/224; 345/419; 345/804
(58) Field of Search ............................... 707/2, 3, 5, 6, 707/101–104.1; 382/232, 305, 224, 115, 209, 218, 219, 220

(56) References Cited

U.S. PATENT DOCUMENTS

| | | | |
|---|---|---|---|
| 5,647,058 A | * 7/1997 | Agrawal et al. | 395/601 |
| 5,893,095 A | * 4/1999 | Jain et al. | 707/6 |
| 5,893,104 A | * 4/1999 | Srinivasan et al. | 707/102 |
| 5,911,139 A | * 6/1999 | Jain et al. | 707/3 |
| 5,913,205 A | * 6/1999 | Jain et al. | 707/2 |
| 5,915,250 A | * 6/1999 | Jain et al. | 707/100 |
| 6,084,595 A | * 7/2000 | Bach et al. | 345/431 |
| 6,181,818 B1 | * 1/2001 | Sato et al. | 382/170 |

OTHER PUBLICATIONS

Duda, R.O., et al., "Linear Properties," In *Pattern Classification and Scene Analysis,* Section 9.3.2, (NY:A. Wiley & Sons), pp. 345–348 (1973).

* cited by examiner

Primary Examiner—Safet Metjahic
Assistant Examiner—Jacques Veillard
(74) Attorney, Agent, or Firm—Hamilton, Brook, Smith & Reynolds, P.C.

(57) ABSTRACT

A system creates and uses a visual image index for visual image retrieval. The visual image index uses multi-level filtering to reduce the processing and storage needed to identify visual images in a table that have similar characteristics to those of a query image. Information about a visual image is stored in an image signature that contains data about basic visual primitives of the image (e.g., global color, local color, texture and structure). The signature is stored in a database table along with the image itself (or a link to the image). Visual image retrieval is performed by searching for signatures in the database that are similar to the signature of the query image. The multi-level filtering reduces the number of candidate images, before a full comparison is done on the filtered-set of candidate image signatures. The first sub-filter performs a range-based query on a table of image attributes culled from the image signature, each attribute in this table is indexed. The results of the range-based sub-filter are processed by a functional predicate sub-filter which determines a distance measure of each resultant image from the query image. The results of the functional predicate sub-filter are compared, using full signature comparison logic, to the query image signature to determine whether the query image is similar to a visual image in the table.

20 Claims, 6 Drawing Sheets

SYSTEM FOR EFFICIENT CONTENT-BASED RETRIEVAL OF IMAGES

BACKGROUND

Images are very useful in a variety of computer applications including medical applications where images can be used to identify specific anatomy and electronic sales catalogs applications where images can be used to display merchandise offered for sale. Additionally, images are useful in many document management applications to enhance document production, as well as in many other computer applications.

Traditionally images have been stored on computers individually in separate flat files of various formats, for example Bitmap ("BMP"), Graphics Interchange Format ("GIF"), Tagged Image File Format ("TIFF"), and Joint Photographic Experts Group ("JPEG") format. More recently, database systems have added support for storing images through the implementation of binary large object ("BLOB") datatypes. There are many advantages to managing images using a database system including, transaction control, backup/recovery, security and content-based searching.

Once images are stored in a database system it is desirable to retrieve them based upon their content. Various ways exists to do retrieval, including developing keywords to describe the image. For example, an image of a mountain landscape may be described by keywords such as "mountain", "valley", "snow caps", and "cliffs". One problem with keyword searching is that it is subjectively based upon the author of the keywords, so what one author calls a "hill" another may call a "mountain". Users need tools to match the similarity of images such that images that "look alike" can be retrieved.

Image signatures, derived from basic visual primitives, can be produced to digitally describe and objectively compare images. Signatures can be compared for similarity, the comparison produces a numeric value between 0 (identical) and 100 (very dissimilar). It is up to the user to set an appropriate threshold to decide at what numeric value two images are similar. Signature comparison is a good technique to determine the similarity of two images, but a signature by signature comparison of all images is computationally expensive.

SUMMARY

The present system for content-based retrieval of images addresses the storage, indexing and retrieval of images in a computer storage system. More specifically, the present system relates to the efficient retrieval of selected images in a computer database system by comparing a query image to stored images. General database indexing techniques can be applied to benefit image retrieval.

In particular, the system provides efficient, content-based, searching of visual images through the use of storage indexes and multi-level filters. The image indexes are created from a set of indexable image attributes, these image attributes are derived from an image signature (indexing the image signature itself is not feasible due to its size and structure).

Visual image retrieval can be performed by searching for image signatures in storage structures, such as database tables, that are similar to the image signature of the query image. The process of retrieval incorporates a multi-level filter to reduce the number of candidate images before a full comparison is done on the filtered-set of candidate image signatures. The first sub-filter performs a range-based query on a table having, for example, the rowid of the image row and image attributes derived from the image signature, each attribute in this table is indexed. The results of the range-based sub-filter are processed by a functional predicate sub-filter which determines a distance measure of each resultant image from the query image. The results of the functional predicate sub-filter are compared, using full signature comparison logic, to the query image signature to produce a determination as to whether the query image is similar to any visual image stored in the table.

An image (or a link to an image) can be stored in a database table along with the image's signature. A particular system for visual image indexing and retrieval comprises a database having multiple images stored therein, each visual image having a respective computable visual image signature. This signature is derived from image primitives. The image signature can be further acted upon to produce image signature attributes, these image signature attributes are indexable.

A second (query) image is used to compare against images stored in the database, the query image also having a computable query image signature derived from image primitives. A visual image feature table is created in the database having rows for representing visual images, each row including an identifier and the signature attributes for the respective visual image. Each of the signature attributes for the visual image have an index created upon it.

A range query filter processes the visual image feature table and produces an intermediate result of range query filtered rows whose signature attributes for the visual image represent a range into which corresponding the signature attributes for the query image fit. A functional predicate filter processes the intermediate result of range query filtered rows and produces an evaluation result of functional predicate filtered rows, each functional predicate filtered row satisfying a distance measure as compared to the respective stored visual image. An evaluator performs a full comparison on the visual image signature of each stored visual image represented in the evaluation result against the query image signature resulting in a determination of image similarity as defined by the user.

One embodiment of the present system produces an image signature from a visual image, derives image signature attributes of low cardinality from the image signature and creates an index for each image signature attribute. The resultant indices can be queried to produce an intermediate result of visual images, the intermediate result can be processed using a set of predicate functions to produce a candidate result and a final result of visual images can be determined by comparing the image signatures in the candidate result for similarity.

BRIEF DESCRIPTION OF THE DRAWINGS

The foregoing and other objects, features and advantages of the invention will be apparent from the following more particular description of embodiments of the system for efficient content-based retrieval of images, as illustrated in the accompanying drawings in which like reference characters refer to the same parts throughout the different views. For ease and clarity of description, the drawings are not necessarily to scale, emphasis instead being placed upon illustrating the principles of the invention.

DETAILED DESCRIPTION

Figure 1:
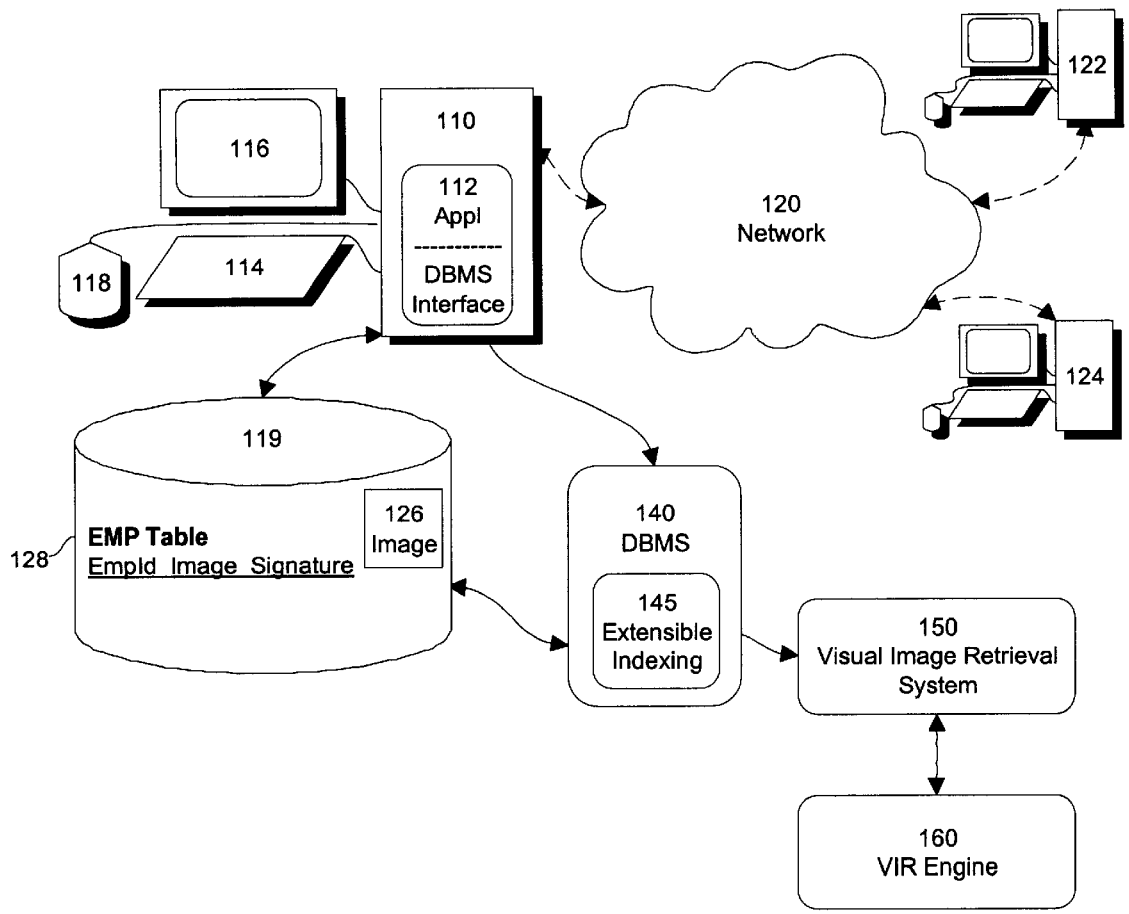
FIG. 1 illustrates an overview of a database management system with extensible indexing capability configured to use indices to search and retrieve images.

FIG. 1 illustrates an overview of a database management system with extensible indexing capability configured to use indices to search and retrieve images. A computer 110 is connected to a monitor 116 for displaying and gathering information, a keyboard input device 114, a storage device 119 and a pointing device 118 for selecting points on the monitor 116. The computer 110 may be connected to other c way of a network 120 to provide distributed processing and storage of visual images. The computer 110 hosts an application program 112 with an interface to a database management system ("DBMS"). The DBMS 140 stores, indexes and provides for the retrieval of data stored therein.

A particular embodiment of the invention is embodied in Oracle 8i, commercially available from Oracle Corporation of Redwood Shores, Calif. Oracle 8i supports a BLOB datatype for direct storage of images within a database system as well as binary file ("BFILE") for managing images stored in external files, including those stored on the Internet as addressable via URLs.

In addition to built-in index types, the DBMS 140 provides for user defined extensions to the index system through extensible indexing 145. The particular search and retrieve visual images. An image on disk 126 is stored in a database table, for example EMP Table 128. Alternatively, a pointer to the image (e.g., using the BFILE or URL datatypes of Oracle 8i) is stored, the pointer providing a reference to the image, possibly stored in a separate file on the storage device 119, or on a machine connected to the network 120, or somewhere on the Internet.

The visual image retrieval system 150 analyzes an image stored in a database table (e.g., EMP Table 128), the results of that analysis on one image can then be compared to the results of an analysis on another image and the similarity of the two images can be determined. The visual image engine 160 provides comprehensive image to image comparison based upon image signatures. An example visual image engine 160 is the so called Visual Information Retrieval ("VIR") Engine commercially available from Virage, Inc. of San Mateo, Calif., embodiments of which are described in U.S. Pat. No. 5,893,095, the teachings of which are incorporated herein by reference in their entirety.

The VIR Engine 160 generates these image signatures and performs image comparison. An image signature is particularly derived from four primitives: global color, local color, texture and structure. It should be understood that more or fewer primitives can be used to derive image signatures, the number and type of primitives may vary based upon characteristics of the images in the application domain. Global color represents the amount of each color within the image, independent of location. Local color represents the distribution of colors in terms of where they occur within an image. Texture represents the low-level patterns within the image, such as graininess or smoothness. Structure represents the shapes found in the image. These four primitives produce a signature of approximately 2K bytes. Weights can be assigned individually to each of the four primitives during a comparison to emphasize one primitive over others when appropriate. For example, in a comparison of two images where color is unimportant and texture is of limited importance but structure is critical, the structure primitive could be given a higher weight than texture and texture could be given a higher weight than either global or local color.

Figure 2:
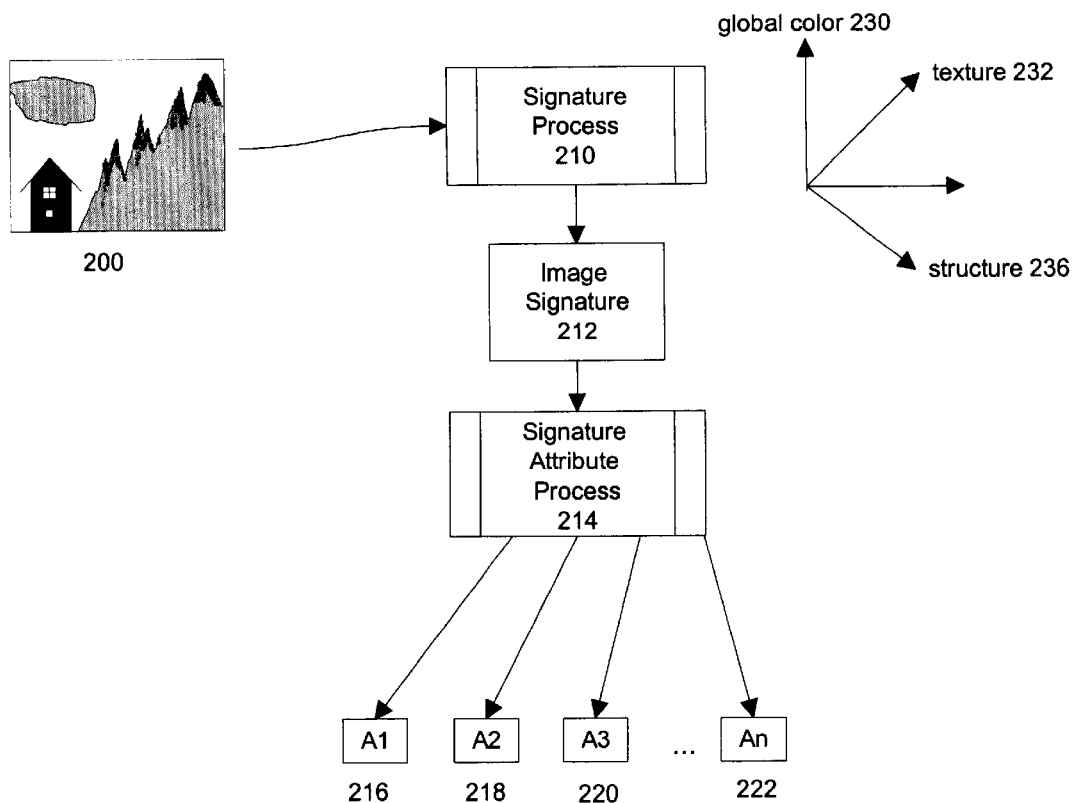
FIG. 2 illustrates a system for producing an image signature and image signature attributes from an image.

The visual image retrieval system 150 can be described by way of an object class definition such as the one below showing data attributes for storing the image and information about the image as well as methods/procedures of acting upon the image. An example class definition is as follows:

Visual Information Retrieval Object Class Definition
//
// Data Attributes
//
   content
   height
   width
   contentLength
   fileFormat
   contentFormat
   compressionFormat
   signature
//
// Methods
//
   MEMBER PROCEDURE copy Content
   MEMBER PROCEDURE setProperties
   MEMBER PROCEDURE process
   MEMBER PROCEDURE processCopy
   MEMBER FUNCTION getMimeType
   MEMBER FUNCTION getcontent
   MEMBER FUNCTION getContentLength
   MEMBER PROCEDURE deleteContent
   MEMBER PROCEDURE analyze
   MEMBER FUNCTION getHeight
   MEMBER FUNCTION getWidth
   MEMBER FUNCTION getFileFormat
   MEMBER FUNCTION getContentFormat
   MEMBER FUNCTION getCompressionFormat
   MEMBER FUNCTION getSignature
   MEMBER FUNCTION checkProperties FIG. 2 illustrates a system for producing an image signature and image signature attributes from an image. An image signature is an approximately 2K byte binary representation that encodes visual attributes of an image based upon a defined set of primitives (e.g., global color 230, texture 232, local color 234, and structure 236). The visual image engine 160 can compare two image signatures and determine their similarity. An image 200, can be stored on a storage device 119 (e.g., as image 126) or within a database table (e.g., as image 304). The image can be input into signature process 210. The signature process 210 is a component of the visual image engine 160 that produces the image signature 212 described above. Indexing the image signature 212 is not practical due to its size and structure.

As additional background, indexing is a technique used to reduce the cost of retrieving information from a database. A database is made up of a number of tables, each table contains a number of rows and each row contains a number of columns. A column, or combination of columns, uniquely identifies each row. Columns that are frequently used in database queries (such as those that uniquely identify a row within a table) can be indexed. Indexes are structures created from one or more columns within a table that are specially organized to provide faster access to rows containing data of interest. For example, a database may contain a table of employees, each employee being uniquely identified by their employee-id number. Without an index, each record in the employee table may have to be examined in order to find a specific employee. With an index, an efficient search can be done on the index prior to accessing the actual employee table. The index can produce a pointer to the exact record (rowid) within the employee table, thus reducing the cost of the query.

It is therefore advantageous to index the image signature data. The image signature 212 is converted into a number of image attributes (e.g., A1 216, A2 218, A3 220 . . . An 222) by the signature attribute process 214 that encodes specific visual attributes of the image into low cardinality integers (e.g., a one byte color scale from 0 to 255) which can be indexed. A trade-off is present when determining the number of image attributes to derive from the image signature. It is important to balance the number of image signature attributes needed to accurately represent the visual image with those image signature attributes that result in low cardinality values. The purpose of an index is to provide pointers to the rows (tuples) in a database table that contain a given key value, this is typically achieved by storing a list of rowids for each unique key value. Low cardinality values are particularly suited to bitmap index techniques. A bitmap index stores a bitmap for each unique key value. Each bit in the bitmap corresponds to a possible rowid, if the bit is set the corresponding rowid contains the key value. A mapping function converts bit positions into actual rowids, so the bitmap index provides the same functionality as a regular index, but can use less storage space and be queried (especially in combination with other bitmap indices) faster than a traditional index when the key values are of low cardinality.

Figure 3:
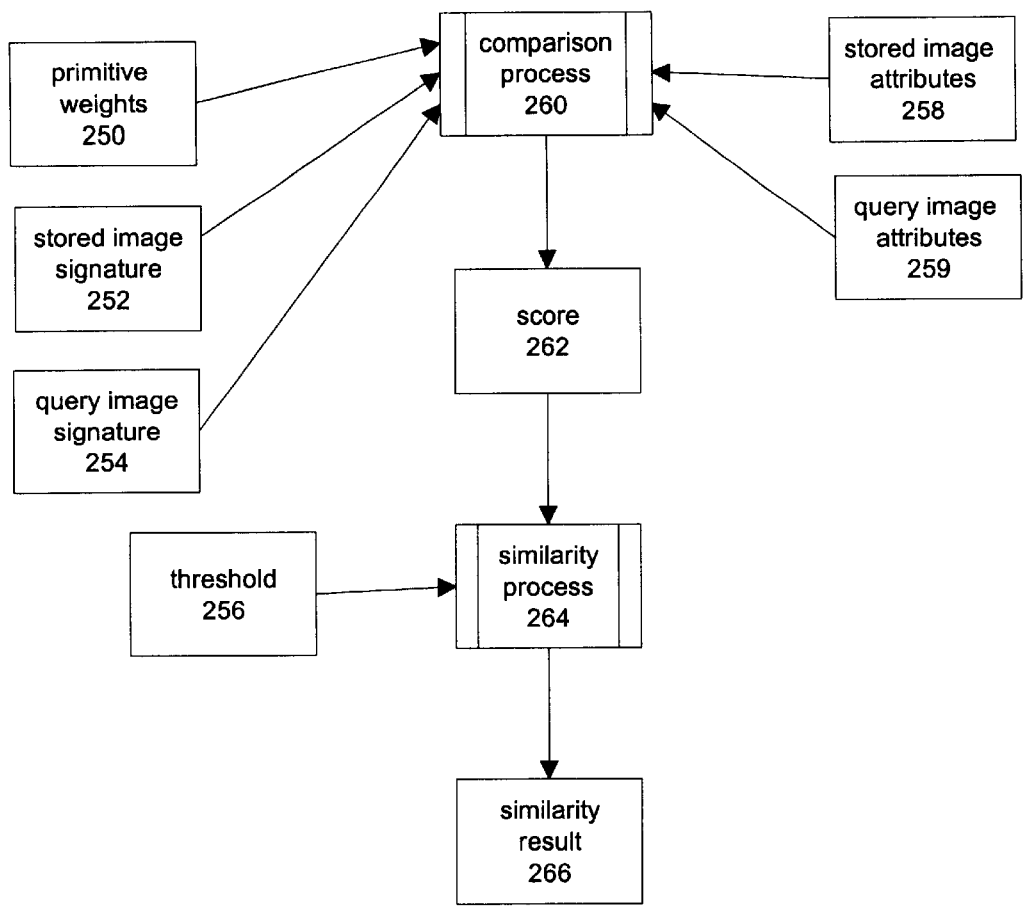
FIG. 3 illustrates a system for comparing images using an image signature and image signature attributes.

FIG. 3 illustrates a system for comparing images using an image signature 212 and image signature attributes (216–222). A comparison process 260 compares two images and returns a score 262. The score is a numerical representation of the similarity of two images where a value of zero represents an exact match and a value of 100 represents very dissimilar images. The comparison process 260 takes as input the image signatures (252 and 254) and image attributes (258 and 259) of each image, as well as primitive weights 250. The image attributes (258 and 259) are grouped into primitive groups and each primitive group can be assigned a primitive weight 250 for use in comparison. The score 262 produced by the comparison process 260 is then evaluated against a user input threshold 256 to determine the similarity result 266. The similarity result 266 is a boolean value that determines the similarity based upon comparing the score 262 to the threshold 256.

Figure 4:
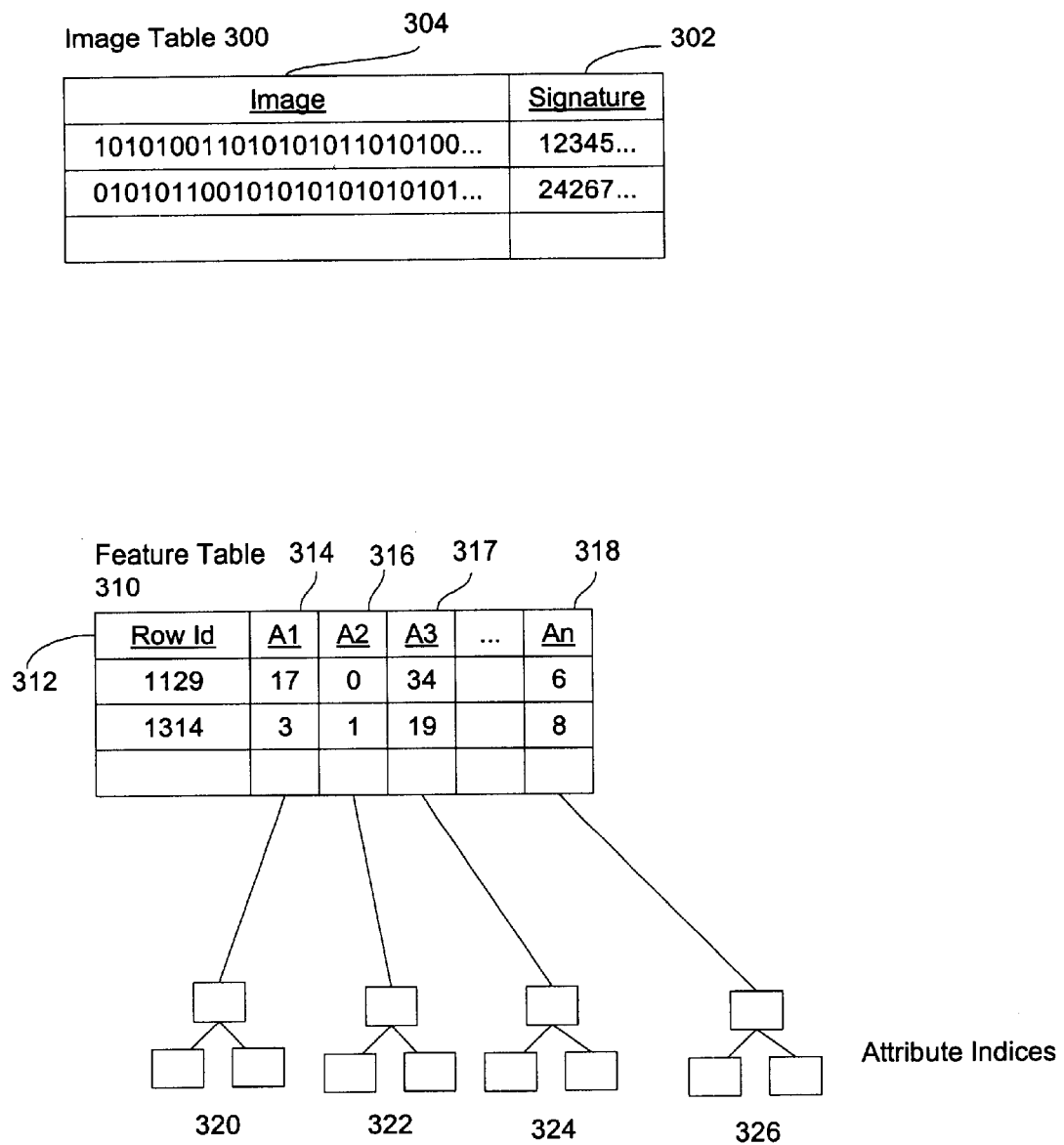
FIG. 4 illustrates a database table layout for storing images, image signatures and image signature attributes.

FIG. 4 illustrates a database table layout for storing images, image signatures and image signature attributes. An image 200 can be represented as a binary string in one of many digital file formats described above (e.g., BMP, GIF, TIFF). This binary representation can be stored in a separate file as an image 126 on a storage device 119, or it may be stored in an image column 304 within an image table 300. The image signature 212, produced by the signature process 210, is stored in signature column 302 within the image table 300. As described above, alternative storage representations of the image 200 as a pointer to a separate file (e.g., BFILE) in the image column 304 can also be employed. Each row in a database table (e.g., image table 300) is addressable by a rowid.

A feature table 310 maintains image attributes A1 . . . An (314–318) for an image 200 stored in image column 304 of image table 300. The value of "n" may vary based upon the visual domain of the images, one embodiment uses 83 attributes grouped into the four visual primitive groups. The image attributes A1 . . . An (314–318) are associated with a particular image column 304 entry by way of a rowid identifying a particular row in the image table 300. Each image attribute A1 . . . An (314–318) has an index (320–326) built on it to facilitate efficient searching. Based upon the low cardinality of image attribute (314–318) values these indices are preferably bitmap indices.

Figure 5:
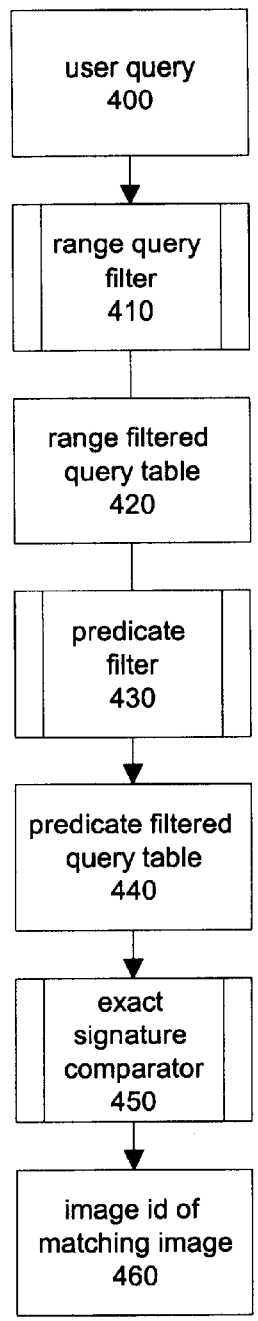
FIG. 5 illustrates the various filters used in the comparison process.

FIG. 5 illustrates process of identifying images similar to that of a query image by the use of various filters. The user query 400 may be presented in a database query language such as Structured Query Language ("SQL"). An example SQL query may take the form:

SELECT ImageTable.Image FROM ImageTable
   WHERE SIMILAR(ImageTable.Signature,
     QuerySignature, 75)

This query selects images from the image table that are similar to a query image (QuerySignature), at least to an example threshold level of 75. An alternate user query 400 may take the form:

SELECT ImageTable.Image FROM ImageTable
   WHERE SIMILAR(ImageTable.Signature,
     QuerySignature,
     GlobalColor=0.5, LocalColor=0.25, Structure=0,
     Texture=0.25, 75)

This query selects images from the image table that are similar to a query image (QuerySignature), at least to an example threshold level of 75, after weighting the comparison, such that global color is twice as important as either local color or texture, and structure attributes are completely ignored.

The creation of the table of similar images proceeds through a series of filters that attempt to reduce the number of images that are candidates for exact signature comparison. The range query filter 410 selects images 200 in the image column 304 that have image attributes A1 . . . An (314–318) with values in a common range with the query image. In typical applications, the range query filter can reduce the number of candidate images to approximately 25% to 30% of the entire image table 300. An example range query generated by the range query filter may take the form:

SELECT RowId FROM FeatureTable
   WHERE A1 ISBETWEEN 7 AND 35,
     A2 =1, . . .
     An ISBETWEEN 2 AND 55

This query produces a range filtered query table 420 which will be used as input to the predicate filter 430.

The predicate filter 430 further reduces the images for exact comparison by computing functions that compute the weighted distance between image attributes A1 . . . An (314–318). These functions are standard in the art and examples can be found in *Pattern Classification and Scene Analysis* by Duda & Hart, copyright 1973 John Wiley & Sons, Inc., the teachings of which are incorporated herein by reference in their entirety. In typical applications the predicate filter can reduce the number of candidate images another approximately 20% to 30% from the range filtered query table 420, resulting in a predicate filtered query table 440 that represents approximately 5% to 9% of the entire image table 300. These remaining images represented by the predicate filtered query table 440 are now compared on an image signature 212 by image signature 212 basis by the exact signature comparator 450. The exact signature comparator 450 is a component of the visual image engine 160 and produces a similarity score 262 that is compared to the threshold 256 specified by the user to produce the table of similar images that the user queried for in user query 400.

Under certain circumstances (e.g., a very small number of images identified by the query range filter) execution of the predicate filter 430 can be avoided and filtering can proceed directly to the exact signature comparator 450, thus saving the cost of running the predicate filter 430.

Figure 6:
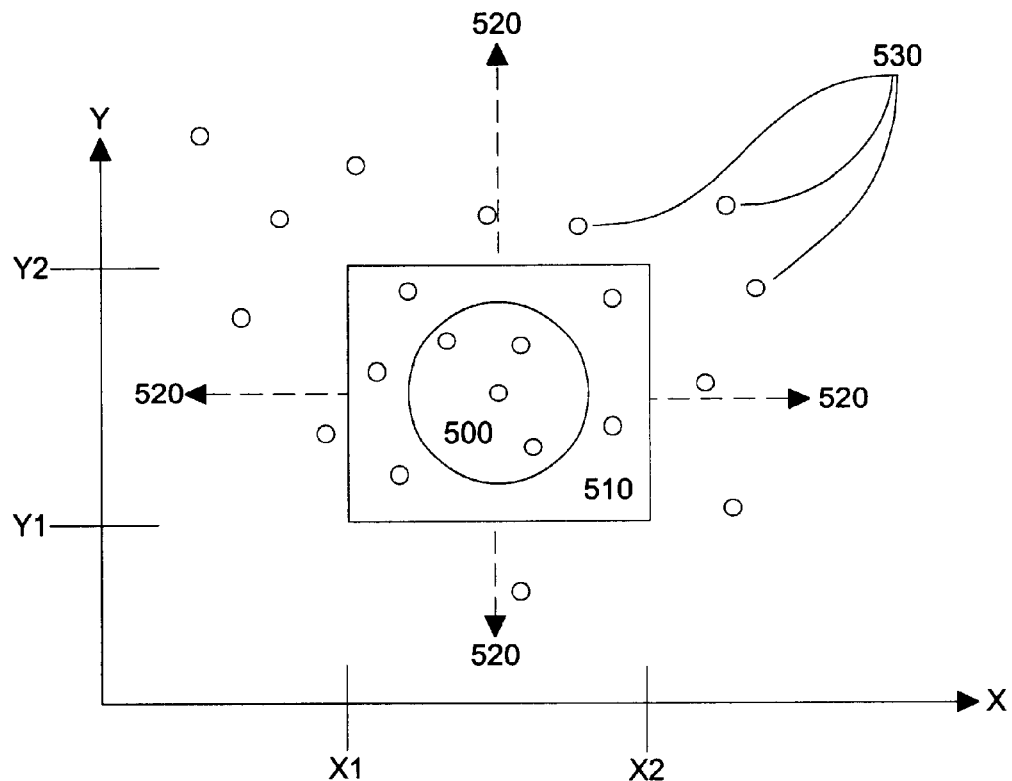
FIG. 6 illustrates a conceptual scatter-plot of image signature attributes with the bounding effects that various filters have upon a set of candidate images.

FIG. 6 illustrates a conceptual 2-dimensional scatter-plot of image signature attributes represented as points 530 showing the effects that various filters have upon the set of images passed to the exact signature comparator 450. In reality the plot would be n-dimensional, with each dimension associated with a specific image attribute A1 . . . An (314–318). Here the scatter-plot has an X-axis representing a specific image attribute (e.g., A1 314) and a Y-axis representing values of another specific image attributes (e.g., A2 316) with values spread across the entire range 520. For example, the range X1 to X2 may represent a global color of red with values between 7 and 35, and the range Y1 to Y2 may represent a global color of blue with values between 9 and 11. The box 510 represents the set of image signature attributes 530 that pass the range query filter. Applying predicate filter 430 to the set of image attributes that pass range query filter 410 produces the predicate filtered query table 440 represented by the circle 500. The set of images associated with the image attributes represented by the circle 500 are those then passed to the exact signature comparator 450.

It will be apparent to those of ordinary skill in the art that methods involved in the present invention may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this invention has been particularly shown and described with references to embodiments thereof, it will be understood by those skilled in the art that various changes in form and details may be made therein without departing from the spirit and scope of the invention as defined by the appended claims.

We claim:

1. A system for storing visual images comprising:
    a store having a plurality of visual images held therein, each visual image having a respective computable visual image signature derived from a plurality of image primitives and a plurality of signature attributes derived from the visual image signature;
    a query image having a respective computable query image signature derived from the plurality of the image primitives and a plurality of the signature attributes derived from the query image signature;
    a visual image feature structure in the store having a plurality of containers for holding visual images, each contained including an identifier and the signature attributes for the respective visual image, each of the signature attributes for the respective visual image having an index;
    a reduction filter that reduces the number of containers that are candidates for full comparison into a candidate result; and
    an evaluator for performing the full comparison of the visual image signature of each stored visual image represented in the candidate result against the query image signature and returning a final result of the visual images that are similar to the query image;
    wherein the reduction filter further comprises at least one of:
        a range query filter that processes the visual image feature structure and produces an intermediate result of range query filtered containers whose signature attributes for the visual image represent a range into which the corresponding signature attributes for the query image fit; and
        a functional predicate filter that processes the intermediate result of range query filtered containers and produces a candidate result of functional predicate filtered containers, the visual signature attributes of each container satisfying a distance measure when compared to the query image signature attributes.

2. The system of claim 1 wherein the store is a database, the feature structure, the intermediate result, and the candidate result are database tables and the container is a row within a database table.

3. The system of claim 1 wherein the signature attributes are grouped into primitive groups, each primitive group sensitive to a weighted selectivity factor during signature attribute comparisons.

4. The system of claim 1 wherein the index is a bitmap index.

5. The system of claim 1 further comprising an interface facilitating the creation of the index.

6. The system of claim 1 further comprising an interface facilitating the querying of the index, including a command to determine a similarity score representing the similarity between the query image and one of the stored visual images.

7. The system of claim 1 further comprising an interface facilitating an evaluation of similarity, including a command to determine similarity by comparing the similarity score and a user defined similarity threshold.

8. A system for storing visual images comprising:
    a store having a plurality of visual images held therein, each visual image having a respective computable visual image signature derived from a plurality of image primitives and a plurality of signature attributes derived from the visual image signature;
    a query image having a respective computable query image signature derived from the plurality of the image primitives and a plurality of the signature attributes derived from the query image signature;
    a visual image feature structure in the store having a plurality of containers for holding visual images, each container including an identifier and the signature attributes for the respective visual image, each of the signature attributes for the respective visual image having an index;
    a reduction filter that reduces the number of containers that are candidates for full comparison into a candidate result;
    an evaluator for performing the full comparison of the visual image signature of each stored visual image represented in the candidate result against the query image signature and returning a final result of the visual images that are similar to the query image; and an optimization module which determines conditions that indicate that at least a portion of the reduction filter should not be run and disables the respective portion of the reduction filter.

9. The system of claim 8 wherein the portion of the reduction filter is a functional predicate filter.

10. A method for storing visual images comprising:

(a) populating a store having a plurality of visual images stored therein, each visual image having a respective computable visual image signature derived from a plurality of image primitives and a plurality of signature attributes derived from the visual image signature;

(b) identifying a query image having a respective computable query image signature derived from the plurality of the image primitives and a plurality of the signature attributes derived from the query image signature;

(c) storing in a visual image feature structure of the store a plurality of containers representing visual images, each container including an identifier and the signature attributes for the respective visual image, each of the signature attributes for the respective visual image having an index;

(d) performing a range query filter that processes the visual image feature structure and produces an intermediate result of range query filtered containers whose signature attributes for the visual image represent a range into which corresponding the signature attributes for the query image fit;

(e) performing a functional predicate filter that processes the intermediate result of range query filtered containers and produces a evaluation result of functional predicate filtered containers, the visual signature attributes of each container satisfying a distance measure when compared to the query image signature attributes; and (f) performing a full comparison of the visual image signature of each stored visual image represented in the evaluation result against the query image signature and returning a final result of the visual images that are similar to the query image.

11. The method of claim 10 further comprising grouping the signature attributes into primitive groups, each primitive group sensitive to a weighted selectivity factor during signature attribute comparisons.

12. The method of claim 10 wherein the index is a bitmap index.

13. The method of claim 10 further comprising optimizing the functional predicate filter such that conditions indicating when the functional predicate filter should not be run are determined and, under those conditions, the functional predicate filter is not run.

14. A computer program product comprising:

a computer usable medium for storing visual images;

a set of computer program instructions embodied on the computer usable medium, including instructions to:

populate a store having a plurality of visual images stored therein, each visual image having a respective computable visual image signature derived from a plurality of image primitives and a plurality of signature attributes derived from the visual image signature;

identify a query image having a respective computable query image signature derived from the plurality of the image primitives and a plurality of the signature attributes derived from the query image signature;

store in a visual image feature structure of the store a plurality of containers representing visual images, each container including an identifier and the signature attributes for the respective visual image, each of the signature attributes for the respective visual image having an index;

perform a range query filter that processes the visual image feature structure and produces an intermediate result of range query filtered containers whose signature attributes for the visual image represent a range into which corresponding the signature attributes for the query image fit;

perform a functional predicate filter that processes the intermediate result of range query filtered containers and produces a evaluation result of functional predicate filtered containers, the visual signature attributes of each container satisfying a distance measure when compared to the query image signature attributes; and perform a full comparison of the visual image signature of each stored visual image represented in the evaluation result against the query image signature and returning a final result of the visual images that are similar to the query image.

15. The computer program product of claim 14 wherein the instructions further include instructions to:

group the signature attributes into primitive groups, each primitive group sensitive to a weighted selectivity factor during signature attribute comparisons.

16. The computer program product of claim 14 wherein the index is a bitmap index.

17. The computer program product of claim 14 wherein the instructions further include instructions to:

optimize the functional predicate filter such that conditions indicating when the functional predicate filter should not be run are determined and, under those conditions, the functional predicate filter is not run.

18. A system for filtering visual images represented by signature attributes with a query image represented by query image signature attributes, the system comprising:

a range query filter that processes the visual images and produces an intermediate result of a range query filtered visual images whose signature attributes for the visual images represent a range into which the corresponding query image signature attributes for the query image fit; and a functional predicate filter that processes the intermediate result of range query filtered visual images and produces a candidate result of functional predicate filtered visual images, the signature attributes of each candidate visual image satisfying a distance measure when compared to the query image signature attributes.

19. A method for filtering visual images represented by signature attributes with a query image represented by query image signature attributes, comprising:

filtering the visual images using a range query filter to produce an intermediate result of range query filtered visual images whose signature attributes for the visual images represent a range into which the corresponding query image signature attributes for the query image fit; and filtering the intermediate result of range query filtered visual images using a functional predicate filter to produce a candidate result of functional predicate filtered visual images, the signature attributes of each candidate visual image satisfying a distance measure when compared to the query image signature attributes.

20. A computer program product comprising:

a computer usable medium for filtering visual images represented by signature attributes;

a set of computer program instructions embodied on the computer usable medium, including instructions to:

filter the visual images using a range query filter to produce an intermediate result of range query filtered visual images whose signature attributes for the visual images represent a range into which the corresponding query image signature attributes for the query image fit; and filter the intermediate result of range query filtered visual images using a functional predicate filter to produce a candidate result of functional predicate filtered visual images, the signature attributes of each candidate visual image satisfying a distance measure when compared to the query image signature attributes.

* * * * *